United States Patent

Houjou

(10) Patent No.: US 8,636,353 B2
(45) Date of Patent: Jan. 28, 2014

(54) IMAGE FORMING METHOD AND IMAGE FORMING APPARATUS

(75) Inventor: Hiroaki Houjou, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/526,001

(22) Filed: Jun. 18, 2012

(65) Prior Publication Data

US 2012/0274718 A1 Nov. 1, 2012

Related U.S. Application Data

(62) Division of application No. 12/410,290, filed on Mar. 24, 2009, now Pat. No. 8,220,915.

(30) Foreign Application Priority Data

Mar. 25, 2008 (JP) .................................. 2008-077725

(51) Int. Cl.
*B41J 2/01* (2006.01)
*B41J 2/195* (2006.01)
*B41J 29/38* (2006.01)

(52) U.S. Cl.
USPC .......... 347/102; 347/5; 347/6; 347/7; 347/95; 347/100; 347/101

(58) Field of Classification Search
USPC .......................................... 347/6, 7, 100, 102
See application file for complete search history.

(56) References Cited

U.S. PATENT DOCUMENTS

| 7,182,454 | B2 | 2/2007 | Nakazawa |
| 7,478,902 | B2 | 1/2009 | Prasad et al. |
| 2004/0207703 | A1 | 10/2004 | Doi |
| 2005/0212884 | A1 | 9/2005 | Ueki et al. |
| 2006/0092251 | A1 | 5/2006 | Prasad et al. |
| 2006/0203055 | A1 | 9/2006 | Doi |
| 2007/0076070 | A1 | 4/2007 | Makuta et al. |
| 2007/0146454 | A1* | 6/2007 | Doi et al. ...................... 347/100 |
| 2007/0222811 | A1 | 9/2007 | Yanagi |
| 2008/0071007 | A1 | 3/2008 | Spinelli |
| 2008/0165237 | A1 | 7/2008 | Yamauchi et al. |

FOREIGN PATENT DOCUMENTS

| CN | 1519112 A | 8/2004 |
| JP | 6-184478 A | 7/1994 |
| JP | 2004-188704 A | 7/2004 |
| JP | 2005-329605 A | 12/2005 |
| JP | 2007-196417 A | 8/2007 |
| WO | WO 2006/052372 A1 | 5/2006 |
| WO | WO 2006/129476 A1 | 12/2006 |

* cited by examiner

*Primary Examiner* — Ryan Lepisto
(74) *Attorney, Agent, or Firm* — Birch, Stewart, Kolasch & Birch, LLP

(57) ABSTRACT

An image forming method includes the steps of: depositing an ink containing 10% or more and less than 30% of a water-soluble high-boiling-point organic solvent having an SP value of 28 or lower, onto a recording medium in accordance with an image signal, the ink having a viscosity of 10 cP or lower in a case where a temperature of the ink is 25° C.; removing water contained in the solvent of the ink on the recording medium, by a heating drying device; and heating and pressurizing the ink so as to fix the ink onto the recording medium.

5 Claims, 1 Drawing Sheet

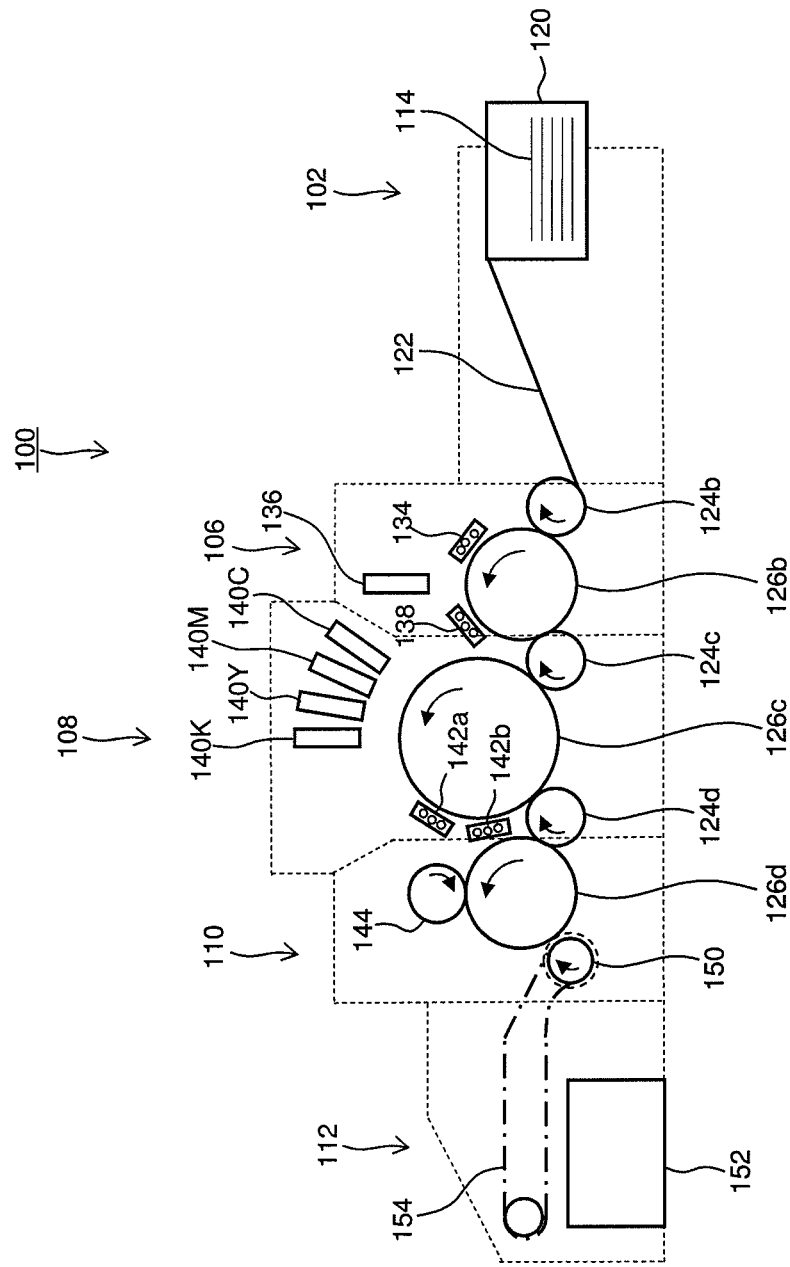

IMAGE FORMING METHOD AND IMAGE FORMING APPARATUS

This application is a Divisional of copending application Ser. No. 12/410,290 filed on Mar. 24, 2009 now U.S. Pat. No. 8,220,915, which claims priority to Application No. JP2008-0777725 filed in Japan, on Mar. 25, 2008. The entire contents of all of the above applications are hereby incorporated by reference.

BACKGROUND OF THE INVENTION

1. Field of the Invention

The present invention relates to an image forming method and an image forming apparatus, and more particularly to an image forming method and an image forming apparatus for forming an image on a recording medium by using an ink.

2. Description of the Related Art

In general, an inkjet recording apparatus comprises an inkjet head in which a plurality of nozzles are formed, and forms an image on a recording medium by ejecting ink droplets respectively from the nozzles onto a recording medium; such apparatuses are used widely due to their excellent low-noise operation, low running costs, and their ability to record images of high quality onto recording media of many different types.

Japanese Patent Application Publication No. 6-184478 discloses a method in which the adhesiveness between a recording medium and an ink image is improved by printing ink onto a recording medium and fixing the ink by applying heat and pressure.

Furthermore, Japanese Patent Application Publication No. 2007-196417 discloses a single-pass printing method for printing by ejecting droplets of ink from an ink head onto normal paper using an ink containing water, water-soluble organic solvents and a pigment, the water content ratio being equal to or greater than 10 wt % and less than 50 wt % of the total weight of ink, the SP value of the water-soluble organic solvent contained in highest ratio of the water-soluble organic solvents being equal to or greater than 16.5 and less than 24.6, and the content ratio of the water-soluble organic solvent having this SP value being equal to or greater than 30 wt % of the total weight of ink, wherein the normal paper is pressurized after ejecting the droplets of ink, thereby fixing the ink.

However, in the method described in Japanese Patent Application Publication No. 6-184478, when performing high-speed recording using a water-based ink, since the fixing process is carried out before the drying of the ink has progressed sufficiently, then drying is inadequate and the image is conveyed to the fixing unit while still containing a large amount of water. If it is sought to fix the image by directly contacting the printed surface of the recording medium with a heating roller, then there are possibilities that the image flows due to insufficient aggregating force in the image, and image offset onto the heating roller occurs. This offset arises because of insufficient strength of the image with respect to the tensile forces acting in the upward and downward directions during the shearing and separating actions applied to the image in the fixing nip operation.

Japanese Patent Application Publication No. 2007-196417 makes it possible to suppress curling and cockling by setting the water content in the ink to less than 50 wt % and using a high content ratio (30 wt % or greater) of water-soluble organic solvent, but there are possibilities that a large amount of organic solvent remains in the image, giving rise to offset of the image onto the heating roller and a decline in fixing properties. Furthermore, as described in Japanese Patent Application Publication No. 2007-196417, problems also arise when pressure is applied to normal paper, but when recording onto a recording medium having a slow rate of permeation of the liquid component, such as a coated paper, the water content is liable to remain on the paper and the problems described above become critical.

SUMMARY OF THE INVENTION

The present invention has been contrived in view of the aforementioned circumstances, an object thereof being to provide an image forming method and image forming apparatus whereby the occurrence of offset during heat and pressure fixing is prevented.

In order to attain an object described above, one aspect of the present invention is directed to an image forming method comprising the steps of: depositing an ink containing 10% or more and less than 30% of a water-soluble high-boiling-point organic solvent having an SP value of 28 or lower, onto a recording medium in accordance with an image signal, the ink having a viscosity of 10 cP or lower in a case where a temperature of the ink is 25° C.; removing water contained in the solvent of the ink on the recording medium, by a heating drying device; and heating and pressurizing the ink so as to fix the ink onto the recording medium.

In order to attain an object described above, another aspect of the present invention is directed to an image forming method comprising the steps of: depositing an aggregating treatment liquid onto a recording medium; depositing an ink containing 10% or more and less than 30% of a water-soluble high-boiling-point organic solvent having an SP value of 28 or lower, onto the recording medium in accordance with an image signal, a viscosity of the water-soluble high-boiling-point organic solvent being 5 cP or lower in a case of a 30% aqueous solution at 25° C.; removing water contained in the solvent of the ink on the recording medium, by a heating drying device; and heating and pressurizing the ink so as to fix the ink onto the recording medium.

The organic solvent, such as glycerine, used as the ink solvent remains in the image in a state of still containing water, after the ejection of ink droplets. Even if it is sought to remove the water content by drying through heating, or the like, in this state, since the majority of the organic solvent, such as glycerine, has a high boiling point, then it is extremely difficult to evaporate off the water content which is contained inside the glycerine. Consequently, if compatibility with high-speed recording is sought, the water content in the image cannot be dried or absorbed completely and problems of offsetting of the image during fixing arise. In view of problems of this kind, the inventor found that it is possible to achieve drying that is compatible with high-speed recording by including a water-soluble high-boiling-point organic solvent having an SP value of 28 or lower, whereby image offset during fixing can be prevented. This is considered to be either because the water content held inside the solvent is reduced, or because the water drying efficiency is improved by the reduced affinity of the solvent with the water.

Furthermore, desirably, the amount of the water-soluble high-boiling-point organic solvent added to the ink is 10% or greater and less than 30%. If the amount is less than 10%, then the wetting properties in the nozzles are insufficient and ejection stability is impaired, and the water content becomes too great and cannot be dried completely. If the amount is 30% or greater, then the amount of organic solvent itself becomes too great, the image strength declines and there is a possibility that image offset may occur.

Furthermore, by selecting a solvent of low viscosity, whereby the ink has a viscosity of 10 cP or lower at 25° C., a beneficial effect is obtained in promoting the permeation of the solvent (including water) of the image into the paper and thus advancing the drying process. Desirably, the ink is heated to 50° C. or higher, and it is more desirable to perform the high-temperature drying since this reduces the viscosity.

Consequently, by comprising a step of ejecting a droplet of ink having a viscosity of 10 cP or lower at 25° C. which includes 10% or more and less than 30% of a water-soluble high-boiling-point organic solvent having an SP value of 28 or lower, onto a recording medium in accordance with an image signal, a step of removing water contained in the solvent of the ink on the recording medium by a heating drying device, and a step of fixing by heating and pressurizing the ink on the recording medium, it is possible to provide an image forming method in which offset does not occur during the step of fixing by heating and pressurization.

Furthermore, if the coloring material component is aggregated by depositing an aggregating treatment liquid which aggregates the coloring material component in the ink, then a beneficial effect is obtained in reinforcing the bonding force between respective coloring material components in the image, and moreover a beneficial effect is obtained in preventing image offset during fixing.

A characteristic issue in aggregating systems is the contraction of the image due to the promotion of drying during the drying (or fixing) process, but in aspects of the present invention a beneficial effect in suppressing aggregation is obtained by including a water-soluble organic solvent having an SP value of 28 or lower, thereby making it possible to prevent image contraction.

By selecting a low-viscosity water-soluble high-boiling-point organic solvent whereby the solvent component (which is equivalent to a 30% aqueous solution of the water-soluble organic solvent) has a viscosity of 5 cP or lower at 25° C. when the solid and liquid separate after aggregation, then a beneficial effect is obtained in promoting the permeation into the paper of the solvent (including water) in the image formed from the aggregate body, and therefore drying is advanced. In such a case also, desirably, the ink is heated to 50° C. or higher, and it is more desirable to perform the high-temperature drying since this reduces the viscosity.

Consequently, by comprising a step of depositing an aggregating treatment liquid onto a recording medium, a step of ejecting droplets of ink which includes 10% or more and less than 30% of a water-soluble high-boiling-point organic solvent having an SP value of 28 or lower and having a viscosity of 5 cP or lower at 25° C. when in a 30% aqueous solution, onto a recording medium in accordance with an image signal, a step of removing water contained in the solvent of the ink on the recording medium by a heating drying device, and a step of fixing by heating and pressurizing the ink on the recording medium, it is possible to provide an image forming method in which offset does not occur during the step of fixing by heating and pressurization.

In a case where the aggregating treatment liquid is used, since the ink undergoes an aggregating reaction when it lands upon the aggregating treatment liquid, and the solid component and the solvent component separate out respectively, then rather than the ink viscosity in a case where the aggregating treatment liquid is not used, the viscosity can be specified in terms of the viscosity of the solvent component at highest concentration (30%).

Desirably, the image forming method comprises the step of rendering the aggregating treatment liquid to a solid or semi-solid state after the step of depositing the aggregating treatment liquid onto the recording medium and before the step of depositing the ink onto the recording medium.

If the aggregating treatment liquid (aggregating component) is deposited in liquid form, then there are concerns that drying might be inadequate due to the deposition of water in addition to the water content of the ink. Therefore, it is possible to resolve such concerns by including a step of rendering the aggregating treatment liquid to a solid or semi-solid state after the step of depositing the aggregating treatment liquid and before the step of ejecting droplets of ink onto the recording medium.

Desirably, the viscosity of the water-soluble high-boiling-point organic solvent is 65 cP or lower in a case where a temperature of the water-soluble high-boiling-point organic solvent is 25° C.

If the water content is evaporated off by carrying out high-speed drying, the high-boiling-point organic solvent is condensed and remains in a considerable amount in the image. If this condensed high-boiling-point organic solvent has a relatively high viscosity, then there is a possibility that it may remain in the image even after the passage of time, thus impairing the fixing properties. Consequently, in order to prevent this, in this aspect, the viscosity of the high-boiling-point solvent itself is restricted to 65 cP or lower. If the viscosity is 65 cP or lower, then the solvent can permeate rapidly into the recording medium after fixing, and therefore decline in the fixing properties can be avoided.

Desirably, a drying temperature of the heating drying device is 50° C. or higher.

According to this aspect of the invention, it is desirable that the temperature at which drying is carried out should be 50° C. or higher. For the heating drying device, it is desirable to use a method such as heating from the rear surface of the medium, irradiation of a radiating heat, blowing of hot air, or the like, and more desirably, a combination of these methods is used.

Desirably, the ink contains a polymer resin.

If a polymer resin is added to the ink in addition to the coloring material, then the polymer resin fuses during the drying and the heat and pressure fixing, and thus has a beneficial effect of reinforcing the bonding force between the respective coloring material components in the image. Consequently, a beneficial effect in further preventing image offset during fixing is obtained. Of course, beneficial effects are of course also obtained in respect of the fixing properties.

Desirably, the recording medium is a coated paper.

According to this aspect of the invention, aspects of the present invention are particularly valuable in cases where the recording medium is coated paper.

In order to attain an object described above, another aspect of the present invention is directed to an image forming apparatus, comprising: an ink droplet ejection device which deposits an ink containing 10% or more and less than 30% of a water-soluble high-boiling-point organic solvent having an SP value of 28 or lower, onto a recording medium in accordance with an image signal, the ink having a viscosity of 10 cP or lower in a case where a temperature of the ink is 25° C.; a heating drying device which removes water contained in the solvent of the ink on the recording medium; and a heating and pressurizing fixing device which heats and pressurizes the ink so as to fix the ink onto the recording medium.

In order to attain an object described above, another aspect of the present invention is directed to an image forming apparatus, comprising: an aggregating treatment liquid deposition device which deposits an aggregating treatment liquid onto a recording medium; an ink droplet ejection device which deposits an ink containing 10% or more and less than 30% of a water-soluble high-boiling-point organic solvent having an SP value of 28 or lower, onto the recording medium in accordance with an image signal, a viscosity of the water-soluble high-boiling-point organic solvent being 5 cP or lower in a case of a 30% aqueous solution at 25° C.; a heating drying device which removes water contained in the solvent of the ink on the recording medium; and a heating and pressurizing fixing device which heats and pressurizes the ink so as to fix the ink onto the recording medium.

In these aspects of the invention, image forming methods as described above are carried out suitably.

According to the present invention, for an image forming method and an image forming apparatus which form an image on a recording medium, it is possible to provide an image forming method and an image forming apparatus which effectively prevent offset from occurring during heat and pressure fixing.

BRIEF DESCRIPTION OF THE DRAWING

The nature of this invention, as well as other objects and benefits thereof, will be explained in the following with reference to the accompanying drawing.

The accompanying drawing is a schematic drawing illustrating one example of an image forming apparatus relating to an embodiment of the present invention.

DETAILED DESCRIPTION OF THE PREFERRED EMBODIMENTS

An aggregating treatment liquid (hereinafter, sometimes simply called a treatment liquid) and an ink used in embodiments of the present invention will be described first, and then the image forming method and image forming apparatus according to an embodiment of the present invention will be described. In embodiments of the present invention, there is also a mode in which a treatment liquid is not used. In a mode where a treatment liquid is not used, the ink relating to embodiments of the present invention contains 10% or more and less than 30% of a water-soluble high-boiling-point organic solvent having an SP value of 28 or lower, and has a viscosity of 10 cP or lower in cases where the ink is 25° C. and in a mode where a treatment liquid is used, the ink contains 10% or more and less than 30% of a water-soluble high-boiling-point organic solvent having an SP value of 28 or lower and a viscosity at 25° C. of 5 cP or lower when in a 30% aqueous solution.

Ink

Inkjet inks according to embodiments of the present invention can be used to form full-color images. In order to form full-color images, it is possible to use a magenta hue ink, a cyan hue ink and a yellow hue ink, and furthermore, it is also possible a black hue ink in order to adjust the color hues. Moreover, it is also possible to use red, green, blue or white inks apart from the yellow, magenta, and cyan hue inks, or to use inks which are known as special color inks in the field of printing.

Such inkjet inks according to embodiments of the present invention are desirably water-based inks and more desirably, inks using a water-dispersible pigment as the coloring material.

Below, the ink component is described in detail.
Water-Dispersible Pigment

Specific examples of water-dispersible pigments are the pigments described in (1) to (4) below.

(1) A capsulated pigment, in other words, a polymer emulsion in which a pigment is contained in polymer micro-particles, and more particularly, a pigment which has been dispersed in water by coating pigment with a hydrophilic water-insoluble resin and thereby rendering the pigment surface hydrophilic by means of a resin layer.

(2) A self-dispersing pigment, in other words, a pigment having at least one type of hydrophilic group on the surface thereof, and which shows at least one of water dispersible properties and water soluble properties in the absence of a dispersant, and more particularly, a pigment elemental substance which is dispersed in water by rendering the pigment hydrophilic by means of a surface oxidation treatment principally using carbon black, or the like.

(3) A resin-dispersed pigment, in other words, a pigment dispersed by a water-soluble polymer compound having a weight-average molecular weight of 50,000 or less.

(4) Surfactant-dispersed pigment, in other words, a pigment dispersed by a surfactant.

Desirable examples are (1) a capsulated pigment and (2) a self-dispersing pigment, and a particularly desirable example is (1) a capsulated pigment.

The micro-capsulated pigment is described in detail below. There are no particular restrictions on the resin used in a micro-capsulated pigment, but it is desirable to use a polymer compound which has self-dispersing properties or solubility in the mixed solvent of water and water-soluble organic solvent, and which has an anionic group (acidic properties). Normally, this resin desirably has a numerical average molecular weight in the range of approximately 1,000 to 100,000, and particularly desirably, in the range of approximately 3,000 to 50,000. Furthermore, desirably, the resin is formed as a solution by dissolving in an organic solvent. By setting the numerical average molecular weight of the resin to this range, it is possible to display a satisfactory function as a coating film in the pigment, or as a coating film in the ink composition. It is desirable to use the resin in the form of a salt of an alkali metal or organic amine.

Specific examples of the resin in the micro-capsulated pigment are: a thermoplastic, thermocurable or denaturable acrylic, epoxy, polyurethane, polyether, polyamide, unsaturated polyester, phenol, silicone or fluorine polymer compound, a polyvinyl material, such as vinyl chloride, vinyl acetate, polyvinyl alcohol, polyvinyl butylal, or the like, a polyester material, such as an alkyd resin, phthalic acid resin, or the like, an amino material such as melamine resin, melamine formaldehyde resin, amino-alkyd co-condensated resin, urea resin, or the like, or a material having an anionic group, such as copolymers or mixtures of these.

Of the resins described above, an anionic acrylic resin is obtained by polymerizing in a solvent an acrylic monomer having an anionic group (hereinafter, called an anionic group-containing acrylic monomer), for example, and according to requirements, another monomer which can be copolymerized with this monomer. An anionic group-containing acrylic monomer is, for example, an acrylic monomer having one or more anionic group chosen from a group comprising a carboxyl group, a sulfone group and a phosphone group, and of these an acrylic monomer having a carboxyl group is particularly desirable.

Specific examples of the acrylic monomer having a carboxyl group are: an acrylic acid, methacrylic acid, crotonic acid, ethacrylic acid, propyl acrylic acid, isopropyl acrylic acid, itaconic acid, fumaric acid, and the like. Of these, an acrylic acid or a methacrylic acid is desirable.

A micro-capsulated pigment can be manufactured by means of a conventional physical method or chemical method, using the components described above. According to a desirable mode of the present invention, such a pigment can be manufactured by means of the methods disclosed in Japanese Patent Application Publication No. 9-151342, Japanese Patent Application Publication No. 10-140065, Japanese Patent Application Publication No. 11-209672, Japanese Patent Application Publication No. 11-172180, Japanese Patent Application Publication No. 10-25440 or Japanese Patent Application Publication No. 11-43636.

In the present invention, it is also possible to cite a self-dispersing pigment as a desirable example. A self-dispersing pigment is a pigment which can disperse in an aqueous solvent without a dispersant, and in which a plurality of hydrophilic functional groups and/or salts thereof (hereinafter, called "dispersibility imparting groups") are bonded directly, or indirectly via an alkyl group, alkyl ether group or aryl group, to the surface of the pigment. Here, "disperse in an aqueous solvent without a dispersant" means a state where the pigment can be dispersed in an aqueous solvent even if a dispersant is not used in order to disperse the pigment.

An ink which contains a self-dispersing pigment as a coloring material does not need to include a dispersant as described above which is included in order to disperse a normal pigment, and consequently virtually no foaming occurs due to the reduction of foam extinction caused by the presence of a dispersant, and hence an ink having excellent ejection stability can be manufactured easily.

Possible examples of the dispersibility imparting groups which bond to the surface of the self-dispersing pigment are —COOH, —CO, —OH, —SO$_3$H, —PO$_3$H$_2$ and quaternary ammonium, and salts of these, and these are manufactured by applying a physical process or chemical process to a pigment starting material and thereby bonding (grafting) a dispersibility imparting group or an active seed having a dispersibility imparting group onto the surface of the pigment. One example of the physical process described above is a vacuum plasma process, for instance. Furthermore, possible examples of the chemical process are: a wet oxidation method which oxidizes the surface of the pigment by means of an oxidizer in water, and a method which bonds a carboxyl group via a phenyl group by bonding a p-amino benzoic acid to the surface of the pigment.

An example which can be cited as a desirable example in embodiments of the present invention is a self-dispersing pigment which has undergone an oxidation process using a hypohalous acid and/or hypohalous acid salt, or a surface treatment using an ozone-based oxidation process. For the self-dispersing pigment, it is also possible to use a commercial product, of which possible examples are: Microjet CW-1 (product name; made by Orient Chemical Industries Ltd.) and CAB-O-JET 200 or CAB-O-JET 300 (product names; made by Cabot Corp.), or the like.

Pigment

There are no particular restrictions on the pigment used in embodiments of the present invention and it may be selected appropriately according to the objectives. For example, the pigment may be an organic pigment or an inorganic pigment.

Possible examples of the organic pigment described above are: an azo pigment, polycyclic pigment, dye chelate, nitro pigment, nitroso pigment, aniline black, or the like. Of these, an azo pigment and polycyclic pigment, or the like, are more desirable. Possible examples of the azo pigment are: azo lake, insoluble azo pigment, condensed azo pigment, chelated azo pigment, and the like. Possible examples of the polycyclic pigment are: a phthalocyanine pigment, perylene pigment, perynone pigment, anthraquinone pigment, quinacridone pigment, dioxazine pigment, indigo pigment, thio indigo pigment, isoindolinone pigment, quinophthalone pigment, and the like. Possible examples of a dye chelate are, for instance, a basic dye chelate, an acidic dye chelate, or the like.

Possible examples of an inorganic pigment are, for instance, titanium oxide, iron oxide, calcium carbonate, barium sulfate, aluminum hydroxide, barium yellow, cadmium red, chrome yellow, carbon black, and the like. Of these, carbon black is particularly desirable. The carbon black can be manufactured, for example, by a commonly known method, such as a contact method, a furnace method, a thermal method, or the like.

In respect of black pigments, specific examples of carbon black are: Raven 7000, Raven 5750, Raven 5250, Raven 5000 ULTRAII, Raven 3500, Raven 2000, Raven 1500, Raven 1250, Raven 1200, Raven 1190 ULTRAII, Raven 1170, Raven 1255, Raven 1080, Raven 1060, Raven 700 (made by Carbon Colombia); Regal 400R, Regal 330R, Regal 660R, Mogul L, Black Pearls L, Monarch 700, Monarch 800, Monarch 880, Monarch 900, Monarch 1000, Monarch 1100, Monarch 1300, Monarch 1400 (made by Cabot Corp.); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, Special Black 4 (made by Degussa); No. 25, No. 33, No. 40, No. 45, No. 47, No. 52, No. 900, No. 2200B, No. 2300, MCF-88, MA600, MA7, MA8, MA100 (made by Mitsubishi Chemical Corp.), or the like, but are not limited in particular to these.

Possible examples of an organic pigment which can be used in embodiments of the present invention are, in the case of a yellow ink pigment: C. I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155, 180, and the like.

Furthermore, possible example of a pigment for magenta ink are: C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48(Ca), 48(Mn), 48:2, 48:3, 48:4, 49, 49:1, 50, 51, 52, 52:2, 53:1, 53, 55, 57(Ca), 57:1, 60, 60:1, 63:1, 63:2, 64, 64:1, 81, 83, 87, 88, 89, 90, 101(iron oxide red), 104, 105, 106, 108 (Cadmium Red), 112, 114, 122 (quinacridone magenta), 123, 146, 149, 163, 166, 168, 170, 172, 177, 178, 179, 184, 185, 190, 193, 202, 209, 219, 269, or the like, and C.I. Pigment Violet 19; and of these C.I. Pigment Red 122 is particularly desirable.

Furthermore, possible examples of a pigment for the cyan ink are: C.I. Pigment Blue 1, 2, 3, 15, 15:1, 15:2, 15:3, 15:34, 16, 17:1, 22, 25, 56, 60, and C.I. Vat Blue 4, 60, 63, or the like; and C.I. Pigment Blue 15:3 is especially desirable.

The pigments described above may be used independently, or a plurality of pigments may be selected from within the groups described above or between the groups described above, and used in combined fashion.

Dispersant

In embodiments of the present invention, for the dispersant used in the capsulated pigment or resin-dispersed resin, it is possible to employ a nonionic compound, an anionic compound, a cationic compound, an amphoteric compound, or the like. For example, it may be a copolymer of a monomer having an α,β-ethylenic unsaturated group, or the like. Possible examples of a monomer having an α,β-ethylenic unsaturated group are: styrene derivatives, such as ethylene, propylene, butene, heptene, hexene, vinyl acetate, allyl acetate, acrylic acid, methacrylic acid, crotonic acid, a crotonic acid ester, itaconic acid, an itaconic acid monoester, maleic acid, a maleic acid monoester, a maleic acid diester, fumaric acid, a fumaric acid monoester, vinyl sulfonic acid, styrene sulfonic acid, sulfonated vinyl naphthalene, vinyl alcohol, acrylamide, methacryloxy ethyl phosphate, bis-methacryloxyethyl phosphate, methacryloxyethyl phenyl acid phosphate, ethylene glycol dimethacrylate, diethylene glycol dimethacrylate, styrene, α-methyl styrene, vinyl toluene, or the like; vinyl cyclohexane, vinyl naphthalene, a vinyl naphthalene derivative, an acrylic acid alkyl ester which may be substituted with an aromatic group, an acrylic acid phenyl ester, a methacrylic acid alkyl ester which may be substituted with an aromatic group, a methacrylic acid phenyl ester, a methacrylic acid cycloalkyl ester, a crotonic acid alkyl ester, an itaconic acid dialkyl ester, a maleic acid dialkyl ester, a vinyl alcohol, or derivatives of these compounds, or the like.

A copolymer obtained by copolymerization of one or a plurality of monomers having an α,β-ethylenic unsaturated group is used as a polymer dispersant. More specific examples of the polymer dispersant are: an acrylic acid alkyl ester-acrylic acid copolymer; a methacrylic acid alkyl ester-methacrylic acid copolymer; a styrene-acrylic acid alkyl ester-acrylic acid copolymer; a styrene-methacrylic acid phenyl ester-methacrylic acid copolymer; a styrene-methacrylic acid cyclohexyl ester-methacrylic acid copolymer; a styrene-styrene sulfonic acid copolymer; a styrene-maleic acid copolymer; a styrene-methacrylic acid copolymer; a styrene-acrylic acid copolymer; a vinyl naphthalene-maleic acid copolymer; a vinyl naphthalene-methacrylic acid copolymer; a vinyl naphthalene-acrylic acid copolymer; polystyrene, polyester, polyvinyl alcohol, or the like.

The dispersant according to an embodiment of the present invention desirably has a weight-average molecular weight of 2,000 to 60,000. The addition ratio of the dispersant of an embodiment of the present invention with respect to the pigment is desirably equal to or greater than 10% and equal to or lower than 100%, in terms of weight ratio. More desirably, the addition ratio of the dispersant is equal to or greater than 20% and equal to or lower than 70%, and even more desirably, equal to or greater than 40% and equal to or lower than 50%.

Water-Soluble Solvent

In a mode where a treatment liquid is not used, inks used in embodiments of the present invention contains 10% or more and less than 30% of a water-soluble high-boiling-point organic solvent having an SP value of 28 or lower, and has a viscosity at 25° C. of 10 cP or lower; and in a mode where a treatment liquid is used, the ink contains 10% or more and less than 30% of a water-soluble high-boiling-point organic solvent having an SP value of 28 or lower and a viscosity at 25° C. of 5 cP or lower when in a 30% aqueous solution. A water-soluble high-boiling-point organic solvent of this kind includes a moistening agent or a penetrating agent.

diethylene glycol monoethyl ether (22.4)
diethylene glycol monobutyl ether (21.5)
triethylene glycol monobutyl ether (21.1)
dipropylene glycol monomethyl ether (21.3)
dipropylene glycol (27.2)

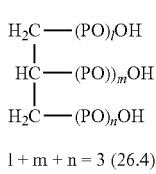

Chemical Formula 1

$l + m + n = 3$ (26.4)

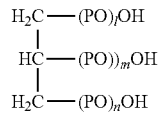

Chemical Formula 2

$l + m + n = 4$ (24.9)

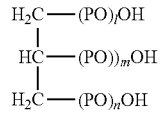

Chemical Formula 3

$l + m + n = 5$ (23.9)

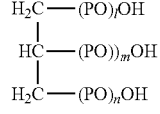

Chemical Formula 4

$l + m + n = 6$ (23.2)

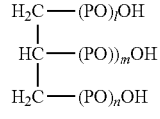

Chemical Formula 5

$l + m + n = 7$ (22.6)

PO = propylene oxy (oxypropylene)

$nC_4H_9O(AO)_4$—H (AO=EO or PO, ratio 1:1) (20.1)
EO=ethylene oxy (oxyethylene)
$nC_4H_9O(AO)_{10}$—H (as above) (18.8)
$HO(A'O)_{40}$—H (A'O=EO or PO, ratio EO:PO=1:3) (18.7)
$HO(A''O)_{55}$—H (A''O=EO or PO, ratio EO:PO=5:6) (18.8)
$HO(PO)_3H$ (24.7)
$HO(PO)_7H$ (21.2)
1,2 hexanediol (27.4)

The numbers in parenthesis indicate SP values.
Furthermore, of the solvents having a low SP value, it is desirable to include the following structure.

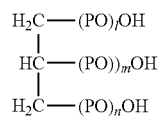

Chemical Formula 6

$l + m + n = 3\text{-}15$

The ratio of the compounds described above in the total amount of organic solvent is desirably 10% or greater, more desirably 30% or greater, and even more desirably 50% or greater.

Furthermore, in embodiments of the present invention, other solvents can be used additionally, in a range where the ratio of solvent having an SP value of 27.5 or lower does not become 90% or lower.

Examples of the additionally used water-soluble organic solvent are: alkane diols (polyvalent alcohols), such as glycerine, 1,2,6-hexane triol, trimethylol propane, ethylene glycol, propylene glycol, diethylene glycol, triethylene glycol, tetraethylene glycol, pentaethylene glycol, dipropylene glycol, 2-butene-1,4-diol, 2-ethyl-1,3-hexane diol, 2-methyl-2,4-pentane diol, 1,2-octane diol, 1,2-hexane diol, 1,2-pentane diol, 4-methyl-1,2-pentane diol, or the like; sugars, such as glucose, mannose, fructose, ribose, xylose, arabinose, galactose, aldonic acid, glucitol (sorbitol), maltose, cellobiose, lactose, sucrose, trehalose, maltotriose, or the like; a sugar alcohol; a hyaluronic acid; a so-called solid humidifier such as a urea; an alkyl alcohol having a carbon number of 1 to 4, such as ethanol, methanol, butanol, propanol, isopropanol, or the like; a glycol ether, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, or the like; 2-pyrrolidone, N-methyl-2-pyrrolidone, 1,3-dimethyl-2-imidazolidinone, formamide, acetamide, dimethyl sulfoxide, sorbit, sorbitan, acetine, diacetine, triacetine, sulfolane, or the like, or one or two or more types of same.

For the object of the drying preventing agent or moistening agent, polyvalent alcohols are valuable, for example, glycerine, ethylene glycol, diethylene glycol, triethylene glycol, propylene glycol, dipropylene glycol, tripropylene glycol, 1,3-butane diol, 2,3-butane diol, 1,4-butane diol, 3-methyl-1,3-butane diol, 1,5-pentane diol, tetraethylene glycol, 1,6-hexane diol, 2-methyl-2,4-pentane diol, polyethylene glycol, 1,2,4-butane triol, 1,2,6-hexane triol, or the like. These may be used independently or two or more types may be used in combination.

For the object of the penetrating agent, a polyol compound is desirable, and possible examples are an aliphatic diol, such as: 2-ethyl-2-methyl-1,3-propane diol, 3,3-dimethyl-1,2-butane diol, 2,2-diethyl-1,3-propane diol, 2-methyl-2-propyl-1,3-propane diol, 2,4-dimethyl-2,4-pentane diol, 2,5-dimethyl-2,5-hexane diol, 5-hexene-1,2-diol, 2-ethyl-1,3-hexane diol, or the like. Of these, the most desirable examples are 2-ethyl-1,3-hexane diol and 2,2,4-trimethyl-1,3-pentane diol.

Water-soluble solvents used in embodiments of the present invention may be used independently, or two or more types of solvent may be used in a combined fashion. The water-soluble organic solvent is used at a content ratio of 1 wt % or greater and 60 wt % or lower, desirably, 5 wt % or greater and 40 wt % or lower, and more desirably, 10 wt % or greater and 30 wt % or lower.

There are no particular restrictions on the added amount of water used in embodiments of the present invention, but desirably, it is 10 percent by mass or greater and 90 percent by mass or lower, and more desirably, 30 percent by mass or greater and 80 percent by mass or lower. Even more desirably, the amount of water is 50 percent by mass or greater and 70 percent by mass or lower.

Surfactant

Possible examples of a surface tension adjuster are: a nonionic, cationic, anionic, or betaine surfactant. In order to achieve good ejection of droplets by an inkjet method, the added amount of surface tension adjuster is desirably an amount which adjusts the surface tension of the ink of embodiments of the present invention to 20 to 60 mN/m, and more desirably, 20 to 45 mN/m and even more desirably, 25 to 40 mN/m.

For the surfactant of an embodiment of the present invention, it is effective to use a compound having a structure which combines a hydrophilic part and a hydrophobic part in the molecule, for instance, and it is possible to use any one of an anionic surfactant, a cationic surfactant, an amphoteric compound, or a nonionic surfactant. Moreover, it is also possible to use the polymer material described above (polymer dispersant), as a surfactant.

Specific examples of an anionic surfactant are, for instance: sodium dodecylbenzene sulfonate, sodium lauryl sulfate, sodium alkyl diphenyl ether disulfonate, sodium alkyl naphthalene sulfonate, sodium dialkyl sulfosuccinate, sodium stearate, potassium oleate, sodium dioctyl sulfosuccinate, sodium polyoxyethylene alkyl ether sulfate, sodium polyoxyethylene alkyl phenyl ether sulfate, sodium stearate, sodium oleate, sodium t-octyl phenoxy ethoxy polyethoxy ethyl sulfate, or the like, and one or two or more types of these may be selected.

Specific examples of a nonionic surfactant are, for instance: a polyoxyethylene lauryl ether, a polyoxyethylene octyl phenyl ether, a polyoxyethylene oleyl phenyl ether, a polyoxyethylene nonyl phenyl ether, an oxyethylene-oxypropylene block copolymer, a t-octyl phenoxyethyl polyethoxy ethanol, a nonyl phenoxyethyl polyethoxy ethanol, or the like, and one or two or more types of these may be selected.

Possible examples of cationic surfactants are: a tetralkyl ammonium salt, an alkyl amine salt, a benzalkonium salt, an alkyl pyrridium salt, an imidazolium salt, or the like, and specific examples thereof are: dihydroxyethyl stearyl amine, 2-heptadecenyl-hydroxyethyl imidazoline, lauryl dimethyl benzyl ammonium chloride, cetyl pyridinium chloride, stearamide methyl pyrridium chloride, or the like.

There are no particular restrictions on the amount of surfactant added to an inkjet liquid composition according to an embodiment of the present invention, but desirably it is 0.1 percent by mass or greater and more desirably, 0.5 to 10 percent by mass and even more desirably, 1 to 3 percent by mass.

Other Components

It is also possible to contain other additives. The other additives may be, commonly known additives, for example, an ultraviolet light absorber, an anti-fading agent, an antibacterial agent, a pH adjuster, an anti-rusting agent, an antioxidant, an emulsion stabilizer, an antiseptic agent, an antifoaming agent, a viscosity enhancer, a dispersion stabilizer, a chelating agent, or the like.

Possible examples of the ultraviolet light absorber are, for instance, a benzophenone-based ultraviolet light absorber, a benzotriazole-based ultraviolet light absorber, a salicylate-based ultraviolet light absorber, a cyanoacrylate-based ultraviolet light absorber a nickel complex salt-based ultraviolet light absorber, or the like.

For the anti-fading agent, it is possible to use an organic or metallic complex anti-fading agent of various types. The organic anti-fading agent may be a hydroquinone, an alkoxy phenol, a dialkoxy phenol, a phenol, an aniline, an amine, an indane, a chromane, an alkoxy aniline, a heterocycle, or the like; and the metallic complex may be a nickel complex, zinc complex, or the like.

Possible examples of the antibacterial agent are: sodium dehydroacetate, sodium benzoate, sodium pyridine thione-1-oxide, p-hydroxy benzoate ethyl ester, 1,2-benzisothiazolin-3-one, sodium sorbate, sodium pentachlorophenol, or the like. Desirably, these are used at a rate of 0.02 to 1.00 wt % in the ink.

There are no particular restrictions on the pH adjuster provided that it is able to adjust the pH to a desired value without creating adverse effects on the prepared recording ink, and the pH adjuster can be selected appropriately in accordance with the objectives; possible examples of the pH adjuster are an alcohol amine (for example, diethanol amine, triethanol amine, 2-amino-2-ethyl-1,3 propane diol, or the like), an alkali metal hydroxide (for example, lithium hydroxide, sodium hydroxide, potassium hydroxide, or the like), an ammonium hydroxide (for example, an ammonium hydroxide or a quaternary ammonium hydroxide), a phosphonium hydroxide, an alkali metal carbonate, or the like.

Possible examples of an anti-rusting agent are: an acidic zinc sulfate salt, sodium thiosulfate, ammonium thiodiglycolate, diisopropyl ammonium nitrate, pentaerythritol tetrasulfate, dicyclohexyl ammonium nitrate, and the like.

Possible examples of an antioxidant are: a phenol-based antioxidant (including a hindered phenol antioxidant), an amine-based antioxidant, a sulfurous antioxidant, a phosphorus antioxidant, or the like.

Possible examples of a chelating agent are: sodium ethylene diamine tetraacetate, sodium nitrilo triacetate, sodium hydroxyethyl ethylene diamine triacetate, sodium diethylene triamine pentaacetate, sodium uramil diacetate, or the like.

Resin Micro-Particles

The resin micro-particles or polymer latex which can be used in embodiments of the present invention may be: an acrylic resin, vinyl acetate resin, styrene-butadiene resin, vinyl chloride resin, acryl-styrene resin, butadiene resin, styrene resin, cross-linked acrylic resin, cross-linked styrene resin, benzoguanamine resin, phenol resin, silicone resin, epoxy resin, urethane resin, paraffin resin, fluorine resin, or the like. Examples of resins which can be cited as desirable examples are: an acrylic resin, acryl-styrene resin, styrene resin, cross-linked acrylic resin, and cross-linked styrene resin.

Desirably, the weight-average molecular weight of the resin micro-particles is equal to or greater than 10,000 and equal to or less than 200,000, and more desirably, equal to or greater than 100,000 and equal to or less than 200,000.

Desirably, the average particle size of the resin micro-particles is in the range of 10 nm to 1 μm, more desirably, the range of 10 to 200 nm, even more desirably, the range of 20 to 100 nm, and particularly desirably, the range of 20 to 50 nm.

The added amount of resin micro-particles with respect to the ink is desirably 0.5 to 20 percent by mass, more desirably, 3 to 20 percent by mass and even more desirably, 5 to 15 percent by mass.

Desirably, the glass transition temperature Tg of the resin micro-particles is 30° C. or above, more desirably, 40° C. or above, and even more desirably, 50° C. or above.

Furthermore, there are no particular restrictions on the particle size distribution of the polymer particles and they may have a broad particle size distribution or they may have a monodisperse particle size distribution. Moreover, it is also possible to combine the use of two or more types of polymer micro-particles having a monodisperse particle size distribution.

Treatment Liquid

In embodiments of the present invention, depositing a liquid composition which enhances printing properties onto the print medium can be cited as a desirable example.

One desirable example of a liquid composition which enhances printing properties and can be used in embodiments of the present invention is a liquid composition which generates an aggregate by changing the pH of the ink. In this case, desirably, the pH of the liquid composition is 1 to 6, and more desirably, the pH is 2 to 5, and even more desirably, the pH is 3 to 5. Desirably, the component of the liquid composition is selected from: polyacrylic acid, acetic acid, glycol acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, cumaric acid, thiophene carboxylic acid, nicotinic acid, or derivatives of these compounds, or salts of these, or the like. These compounds may be used singly, or a combination of two or more of these compounds may be used.

Furthermore, a desirable example of a liquid composition which enhances printing properties and can be used in embodiments of the present invention is a treatment liquid to which a polyvalent metallic salt or polyallyl amine has been added. Possible examples of the composition of the liquid composition are: for the polyvalent metallic salt, an alkali rare earth metal of group 2A of the periodic table (for instance, magnesium or calcium), a transition metal of group 3B of the periodic table (for instance, lanthanum), cations from group 3A of the periodic table (for instance, aluminum), a lanthanide (for example, neodium), or polyallyl amine or a derivative of polyallyl amine. Desirable examples are calcium and magnesium. Possible examples of anions which are used desirably as a pairing base of calcium or magnesium are carboxylic acid salts (formic acid, acetic acid, benzoic acid salts, etc.), nitric acid salts, chlorides, and thiocyanic acid salts. These salts are added to the treatment liquid in a ratio in the range of approximately 1 to approximately 10 wt %, desirably approximately 1.5 to approximately 7 wt %, and more desirably, approximately 2 to approximately 6 wt %.

It is also possible to include a resin component in the treatment liquid in order to improve the fixing characteristics and the rub resistance. The resin component may be any resin which would not impair the ejection characteristics from the head if the treatment liquid is ejected in the form of droplets by an inkjet method, and which has stable storage characteristics, and it is possible freely to choose a water-soluble resin, resin emulsion, or the like.

The resin component may be an acrylic polymer, a urethane polymer, a polyester polymer, a vinyl polymer, a styrene polymer, or the like. In order to display sufficiently the functions of the material in improving fixing characteristics, it is necessary to add a polymer of relatively high molecular weight, at a high concentration (1 wt % to 20 wt %). However, if it is sought to add the aforementioned materials by dissolving in the liquid, then the liquid acquires a high viscosity and the ejection characteristics decline. In order to add a suitable material at a high density or to suppress increase in the viscosity, it is effective to adopt a device for adding the material in the form of a latex. Possible latex materials are, for instance: an alkyl copolymer of acrylic acid, carboxyl-modified SBR (styrene-butadiene latex), SIR (styrene-isoprene latex), MBR (methyl methacrylate-butadiene latex), NBR (acrylonitrile-butadiene latex), or the like.

Ink Properties

Desirably, the surface tension of the ink according to embodiments of the present invention is equal to or greater than 20 mN/m and equal to or lower than 60 mN/m. More desirably, it is equal to or greater than 20 mN/m and equal to or lower than 45 mN/m, and even more desirably, equal to or greater than 25 mN/m and equal to or lower than 40 mN/m.

Image Forming Method and Image Forming Apparatus

Next, an image forming method and an image forming apparatus according to an embodiment of the invention are described.

The drawing is a general schematic drawing illustrating an image forming apparatus according to an embodiment of the present invention. The image forming apparatus 100 illustrated in the drawing is a single side machine, which is capable of printing only onto one surface of a recording medium 114. The image forming apparatus 100 includes: a paper supply unit 102, which supplies the recording medium 114; a treatment agent deposition unit 106, which deposits treatment agent onto the recording medium 114; a print unit (image forming unit) 108, which forms an image by depositing the colored inks onto the recording medium 114; a fixing unit 110 fixing the ink on the recording medium 114 onto the recording medium 114; and a paper output unit 112, which conveys and outputs the recording medium 114 on which the image has been formed. In cases where the treatment liquid is not used, the treatment agent deposition unit 106 can be omitted.

A paper supply platform 120 on which the recording media 114 are stacked is provided in the paper supply unit 102. A feeder board 122 is connected to the front (the left-hand side in the drawing) of the paper supply platform 120, and the recording media 114 stacked on the paper supply platform 120 are supplied one sheet at a time, successively from the uppermost sheet, to the feeder board 122. The recording medium 114 that has been conveyed to the feeder board 122 is supplied through a transfer drum 124b to the surface (circumferential surface) of a pressure drum 126b of the treatment agent deposition unit 106.

The treatment agent deposition unit 106 is provided following the paper supply unit 102. The transfer drum 124b is provided between the paper supply unit 102 and the pressure drum 126b of the treatment agent deposition unit 106 so as to make contact with them. In this structure, the recording medium 114 is conveyed to the pressure drum 126b of the treatment agent deposition unit 106 via the transfer drum 124b The paper preheating unit 134 and the treatment liquid drying unit 138 have heaters that can be temperature-controlled within prescribed ranges, respectively. When the recording medium 114 held on the pressure drum 126b passes through the positions opposing the paper preheating unit 134 and the permeation suppression agent drying unit 138, it is heated by the heaters of these units.

The treatment liquid head 136 ejects droplets of the treatment liquid onto the recording medium 114 held on the pressure drum 126b, and can have the same structure as each of the ink heads 140C, 140M, 140Y, and 140K of the print unit 108 described later. An inkjet head is used as the device depositing the treatment liquid on the surface of the recording medium 114 in the present embodiment; however, a device depositing the treatment liquid is not limited to the present embodiment. Such a device applying the treatment liquid may employ various methods, such as a spray method and a roller applying method.

The treatment liquid used in the present embodiment is an acidic liquid which aggregates the coloring materials contained in the inks ejected toward the recording medium 114 from the respective ink heads 140C, 140M, 140Y and 140K arranged in the print unit 108, which is located in the latter stage.

In the present embodiment, the heating performed by the heater of the treatment liquid drying unit 138 is carried out within 5 seconds of depositing the treatment liquid on the surface of the recording medium 114 by the treatment liquid head 136. Consequently, it is desirable that the treatment liquid drying unit 138 should be located in the vicinity of the treatment liquid head 136.

The heating temperature of the heater of the treatment liquid drying unit 138 is set to a temperature whereby the treatment liquid is dried and a solid or semi-solid layer of aggregating treatment agent (a thin layer of dried treatment liquid) is formed on the recording medium 114. Reference here to the "layer of aggregating treatment agent in a solid state or a semi-solid state" includes a layer having a water content of 0% to 70%.

A desirable mode is one in which the recording medium 114 is preheated by the heater of the paper preheating unit 134, before depositing the treatment liquid on the recording medium 114, as in the present embodiment. In this case, it is possible to restrict the heating energy required to dry the treatment liquid to a low level, and therefore energy savings can be made.

The print unit 108 is arranged after the treatment liquid deposition unit 106. A transfer drum 124c is arranged between the pressure drum 126b of the treatment liquid deposition unit 106 and a pressure drum 126c of the print unit 108, so as to make contact with same. Hence, after the treatment liquid is deposited and the solid or semi-solid aggregating treatment agent layer is formed on the recording medium 114 that is held on the pressure drum 126b of the treatment liquid deposition unit 106, the recording medium 114 is transferred through the transfer drum 124c to the pressure drum 126c of the print unit 108.

The print unit 108 is provided with the ink heads 140C, 140M, 140Y and 140K, which correspond respectively to the four colors of ink, C, M, Y and K, and solvent drying units 142a and 142b at positions opposing the surface of the pressure drum 126c, in this order from the upstream side in terms of the direction of rotation of the pressure drum 126c (the counter-clockwise direction in the drawing).

The ink heads 140C, 140M, 140Y and 140K employ the inkjet type recording heads (inkjet heads), similarly to the treatment liquid head 136. The ink heads 140C, 140M, 140Y and 140K respectively eject droplets of corresponding colored inks onto the recording medium 114 held on the pressure drum 126c.

Each of the ink heads 140C, 140M, 140Y and 140K is a full-line head having a length corresponding to the maximum width of the image forming region of the recording medium 114 held on the pressure drum 126c, and having a plurality of nozzles 161 (not illustrated in the drawing) for ejecting the ink, which are arranged on the ink ejection surface of the head through the full width of the image forming region. The ink heads 140C, 140M, 140Y and 140K are arranged so as to extend in a direction that is perpendicular to the direction of rotation of the pressure drum 126c (the conveyance direction of the recording medium 114).

According to the composition in which the full line heads having the nozzle rows covering the full width of the image forming region of the recording medium 114 are provided respectively for the colors of ink, it is possible to record a primary image on the image forming region of the recording medium 114 by performing just one operation of moving the recording medium 114 and the ink heads 140C, 140M, 140Y and 140K relatively with respect to each other (in other words, by one sub-scanning action). Therefore, it is possible to achieve a higher printing speed compared to a case that uses a serial (shuttle) type of head moving back and forth reciprocally in the main scanning direction, which is the direction perpendicular to the sub-scanning direction or the conveyance direction of the recording medium 114, and hence it is possible to improve the print productivity.

Moreover, although the configuration with the four colors of C, M, Y and K is described in the present embodiment, the combinations of the ink colors and the number of colors are not limited to those. Light and/or dark inks, and special color inks can be added as required. For example, a configuration is possible in which ink heads for ejecting light-colored inks, such as light cyan and light magenta, are added. Furthermore, there is no particular restriction on the arrangement sequence of the heads of the respective colors.

Each of the solvent drying units 142a and 142b has a composition including a heater of which temperature can be controlled within a prescribed range, similarly to the paper preheating unit 134 and the treatment liquid drying unit 138 described above. As described hereinafter, when ink droplets are deposited onto the solid or semi-solid aggregating treatment agent layer, which has been formed on the recording medium 114, an ink aggregate (coloring material aggregate) is formed on the recording medium 114, and furthermore, the ink solvent that has separated from the coloring material spreads, so that a liquid layer containing dissolved aggregating treatment agent is formed. The solvent component (liquid component) left on the recording medium 114 in this way is a cause of curling of the recording medium 114 and also leads to deterioration of the image. Therefore, in the present embodiment, after depositing the droplets of the corresponding colored inks from the ink heads 140C, 140M, 140Y and 140K onto the recording medium 114, heating is carried out by the heaters of the solvent drying units 142a and 142b, and the solvent component is evaporated off and the recording medium 114 is dried.

In embodiments of the present invention, desirably, the drying temperature in the solvent drying units 142a and 142b is set to 50° C. or higher, so as to remove the water contained in the solvent of the ink. For the solvent drying units 142a and 142b, it is desirable to use a device such as heating from the rear surface of the medium, irradiation of a radiating heat source, blowing of hot air, or the like, and more desirably, a combination of these devices can be used.

In the present embodiment, the fixing unit 110 is provided following the print unit 108. A transfer drum 124d is arranged between the pressure drum 126c of the print unit 108 and the pressure drum 126d of the fixing unit 110 so as to make contact with same. Hence, the recording medium 114 held on the pressure drum 126c of the print unit 108 is transferred through the transfer drum 124d to the pressure drum 126d of the fixing unit 110.

The fixing unit 110 includes a heating roller 144 the temperature of which is adjustable in the range of 50° C. through 200° C., and fixes the image onto the recording medium 114 while heating and pressurizing the recording medium sandwiched between the pressure drum 126d and the heating roller 144. The heating temperature of the fixing unit 110 is desirably set according to the temperature of glass transition point of the polymer fine particles contained in the ink, or the like. In the present embodiment, the heating temperature of the fixing unit 110 is set to 75° C. In addition, the nip pressure of the fixing unit 110 is desirably set to 0.05 MPa thorough 2 MPa.

The paper output unit 112 is provided following the fixing unit 110. The paper output unit 112 is provided with a paper outputting drum 150 which receives the recording medium 114, a paper outputting base 152 which accommodates the recording media 114, and a paper outputting chain 154 which is provided between a sprocket of the paper outputting drum 150 and a sprocket arranged above the paper outputting base 152 and has a plurality of grippers for outputting paper. The recording medium 114 transferred to the paper outputting drum 150 from the pressure drum 126d is conveyed to the paper outputting base 152 by the paper outputting chain 154.

In the present embodiment, desirably, the recording medium is coated paper. In general, when droplets of ink are ejected onto a recording medium having low permeability, such as coated paper, after depositing an aggregating treatment liquid, the aggregated ink coloring material in the aggregating treatment liquid floats and does not remain in the desired position, and consequently the output image is greatly disturbed in comparison with the desired image. Accordingly, the present embodiment is particularly valuable if the recording medium is a coated paper, and enables image disturbance caused by movement of the coloring material to be prevented effectively.

Possible examples of support media which can be used appropriately for coated paper include: an art paper, a coated paper, and other coated papers such as a cast coated paper, in which a coat layer is provided on a base paper, a size press layer or an anchor coating layer formed using starch, polyvinyl alcohol, or the like is provided on a base paper, or a coat layer is provided on such a size press layer or an anchor coating layer. Such a base paper can be manufactured from main components of wood pulp and pigment mixed with a binder and one or more additive of a sizing agent, fixing agent, yield enhancer, cationization agent, paper strength enhancer, and other additive agents, by using various machines, such as a Fourdrinier paper machine, a cylindrical paper machine, a twin-wire paper machine, and the like. The pulp is either a chemical pulp such as LBKP or NBKP, a mechanical pulp such as GP, PGW, RMP, TMP, CTMP, CMP, CGP, or the like, or recovered paper pulp such as DIP.

In a method according to an embodiment of the present invention, it is possible to use these base papers or coated papers directly without alteration, and it is also possible to use these papers after carrying out a calendering process using a machine calender, TG calender, soft calender, or the like, and thereby controlling the surface flatness of the paper.

There are no particular restrictions on the weight of the support medium, although generally the weight is approximately 40 to 300 g/m$^2$. The coated paper used in embodiments of the present invention has a coating layer formed on the support medium described above. The coating layer comprises a coating composition including a pigment and a binder as main components thereof, and at least one coating layer is formed on the support medium.

For the pigment, it is desirable to use a white pigment. Possible examples of the white pigment include: an inorganic pigment, such as precipitated calcium carbonate, heavy calcium carbonate, magnesium carbonate, kaolin, talc, calcium sulfate, barium sulfate, titanium dioxide, zinc acid, zinc sulfide, zinc carbonate, satin white, aluminum silicate, diatomaceous earth, calcium silicate, magnesium silicate, synthetic non-crystalline silica, colloidal silica, alumina, colloidal alumina, pseudo-boehmite, aluminum hydroxide, lithopone, zeolite, hydrated halloysite, magnesium hydroxide, and the like; and an organic pigment, such as a styrene-based plastic pigment, an acrylic plastic pigment, polyethylene, microcapsules, urea resin, melamine resin, and the like.

The binder may be, for instance: a starch derivative, such as oxidized starch, etherified starch, or phosphoric acid esterized starch; a cellulose derivative, such as carboxymethyl cellulose, hydroxyethyl cellulose, or the like; casein, gelatine, soybean protein, polyvinyl alcohol, or derivatives of same; polyvinyl alcohols having various degrees of saponification or silanol-denatured versions of same, or carboxylates, cationized products, of other derivatives of same; polyvinyl pyrrolidone, maleic anhydride resin, a styrene-butadiene copolymer, a methyl methacrylate-butadiene copolymer, or other conjugated diene copolymer latex; an acrylic polymer latex, such as a polymer or copolymer of acrylate ester and methacrylate ester; a vinyl polymer latex, such as such as an ethylene acetate vinyl copolymer; or a functional group-denatured polymer latex based on these various polymers and a monomer containing a functional group such as a carboxy group; an aqueous adhesive of a heat-curable synthetic resin, such as melamine resin, urea resin, or the like; an acrylate ester or methacrylate ester polymer or copolymer resin, such as polymethylmethacrylate; or a synthetic resin-based adhesive, such as polyurethane resin, unsaturated polyester resin, vinyl chloride-vinyl acetate copolymer, polyvinyl butylal, alkyd resin, or the like.

The combination ratio of the pigment and binder in the coating layer is 3 to 70 parts by weight, and desirably 5 to 50 parts by weight, of binder with respect to 100 parts by weight of pigment. If the combination ratio of the binder with respect to 100 parts by weight of pigment is less than 3 parts by weight, then the coating of the ink receiving layer by the coating composition will have insufficient strength. On the other hand, if the combination ratio is greater than 70 parts by weight, then the supply of high-boiling-point solvent is slowed dramatically.

Moreover, it is also possible to combine various additives in appropriate fashion in the coating layer, such as: a dye fixing agent, a pigment dispersant, a viscosity raising agent, a fluidity enhancer, an antifoaming agent, a foam suppressant, a separating agent, a foaming agent, a permeating agent, a coloring dye, a coloring pigment, a fluorescent brightener, an ultraviolet light absorber, an antioxidant, an anticorrosive, an antibacterial agent, a waterproofing agent, a wet paper strength enhancer, a dry paper strength enhancer, or the like.

The application amount of the ink receiving layer varies depending on the required gloss, the ink absorbing properties and the type of support medium, or the like, and although no general figure can be stated, it is normally 1 $g/m^2$ or greater. Furthermore, the ink receiving layer can also be applied by dividing a certain uniform application amount into two application steps. If application is divided into two steps in this way, then the gloss is improved in comparison with a case where the same application amount is applied in one step.

The application of the coating layer can be carried out using one of various type of apparatus, such as a blade coater, roll coater, air knife coater, bar coater, rod blade coater, curtain coater, short dowel coater, size press, or the like, in on-machine or off-machine mode. Furthermore, after application of the coating layer, it is also possible to carry out a smoothing and finishing process on the ink receiving layer by using a calender apparatus, such as a machine calender, a TG calender, a soft calender, or the like.

The number of coating layers can be determined appropriately in accordance with requirements.

The coating paper may be an art paper, high-quality coated paper, medium-quality coated paper, high-quality lightweight coated paper, medium-quality lightweight coated paper, or light-coated printing paper; the application amount of the coating layer is around 40 $g/m^2$ on both surfaces in the case of art paper, around 20 $g/m^2$ on both surfaces in the case of high-quality coated paper or medium-quality coated paper, around 15 $g/m^2$ on both surfaces in the case of high-quality lightweight coated paper or medium-quality lightweight coated paper, and around 12 $g/m^2$ or less on both surfaces in the case of a light-coated printing paper. An example of an art paper is Tokubishi Art, or the like; an example of a high-quality coated paper is "U-Lite"; examples of art papers are Tokubishi Art (made by Mitsubishi Paper Mills Co., Ltd.), Golden Cask Satin (made by Oji Paper Co., Ltd.), or the like; examples of coated papers are OK Top Coat (made by Oji Paper Co., Ltd.), Aurora Coat (made by Nippon Paper Group Inc.), Recycle Coat T-6 (made by Nippon Paper Group Inc.); examples of lightweight coated papers are U-Lite (made by Nippon Paper Group Inc.), New V Matt (made by Mitsubishi Paper Mills Co., Ltd.), New Age (made by Oji Paper Co., Ltd.), Recycle Mat T-6 (made by Nippon Paper Group Inc.), and "Pism" (made by Nippon Paper Group Inc.). Examples of light-coated printing papers are Aurora L (made by Nippon Paper Group Inc.) and Kinmari Hi-L (made by Hokuetsu Paper Mills, Ltd.), or the like. Moreover, examples of cast coated papers are: SA Gold Cask plus (made by Oji Paper Group Inc.), Hi-McKinley Art (Gojo Paper Mfg. Co., Ltd.), or the like.

By means of an image forming method using the ink described above, in other words, by comprising a step of ejecting droplets of ink having a viscosity of 10 cP or lower at 25° C. which includes 10% or more and less than 30% of a water-soluble high-boiling-point organic solvent having an SP value of 28 or lower, onto a recording medium in accordance with an image signal, a step of removing water contained in the solvent of the ink on the recording medium by a heating drying device, and a step of fixing by heating and pressurizing the ink on the recording medium, it is possible to provide an image forming method in which offset does not occur during the step of fixing by heating and pressurization. Furthermore, by means of an image forming method using the treatment liquid and the ink described above, in other words, by comprising a step of depositing an aggregating treatment liquid onto a recording medium, a step of ejecting droplets of ink which includes 10% or more and less than 30% of a water-soluble high-boiling-point organic solvent having an SP value of 28 or lower and a viscosity of 5 cP or lower at 25° C. when in a 30% aqueous solution, onto a recording medium in accordance with an image signal, a step of removing water contained in the solvent of the ink on the recording medium by a heating drying device, and a step of fixing by heating and pressurizing the ink on the recording medium, it is possible to provide an image forming method in which offset does not occur during the step of fixing by heating and pressurization.

EXAMPLES

Embodiments according to the present invention are described in specific terms below with reference to practical examples, but the present invention is not limited to these examples.

Image formation was carried out under the system conditions where the aggregating treatment liquid drying unit 138 was removed from the image forming apparatus illustrated in the drawing (hereinafter, called a "non-aggregating system"), and under the system conditions illustrated in the drawing (hereinafter called an "aggregating system").

Preparation of Aggregating Treatment Agent

An aggregating treatment agent was prepared by mixing materials according to the following composition.

| | |
|---|---|
| Glycerine | 15 g |
| Malonic acid | 10 g |
| Surfactant 1 (Chemical Formula 7 below) | 1 g |
| Ion-exchange water (Deionized water) | 74 g |

Chemical Formula 7

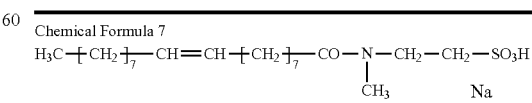

When the pH of the treatment liquid prepared in this way was measured with a Toa DKK pH meter, WM-50EG, the pH was found to be 3.5.

Preparation of Ink

Ink 1 (no polymer)

| | |
|---|---|
| Pigment (magenta) | 4 percent by mass |
| High-boiling-point organic solvent (HBS) | 8 to 35 percent by mass |
| Olefin E1010 (made by Nissin Chemical Industry Co., Ltd.) | 1 percent by mass |
| Deionized water | remainder |

Here, the types of high-boiling-point organic solvents indicated in Tables 1 to 3 below were added at the stated content ratios (parts by weight).

Ink 2 (Polymer Added)

| | |
|---|---|
| Pigment (magenta) | 4 wt % |
| Joncryl 537 (made by Johnson Polymers) | 4 or 8 wt % |
| New Pole GP-250 (made by Sanyo Chemical Industries, Ltd.) | 10 wt % |
| Olefin E1010 (made by Nissin Chemical Industry Co., Ltd.) | 1 wt % |
| Deionized water | remainder |

The notations used for the types of solvent in Tables 1 to 3 have the following meanings.

Gly: glycerine

DEG: diethylene glycol,

TEA: triethanol amine,

DPG: dipropylene glycol,

DEGmEE: diethylene glycol monoethyl ether,

In the experiments with the non-aggregating system, a treatment liquid layer was provided on the recording medium (Tokubishi art made by Mitsubishi Paper Mills., Ltd.). In the experiments with both the non-aggregating system and the aggregating system, droplets of ink were ejected onto a recording medium from the head in accordance with an image signal. Recording was carried out at an ink ejection volume of 2 pl and a recording density of 1200 dpi in both the main scanning direction and the sub-scanning direction. Thereupon, a warm air flow was used as the drying device and the surface of the recording medium was dried with a warm air flow at 50° C. for five seconds.

Finally, the image was fixed by applying heat and pressure. In the present experiment, the applied temperature and pressure were set to 75° C. and 0.2 MPa, respectively.

Here, an experiment was carried out by changing the high-boiling-point organic solvent (HBS) in the ink to the high-boiling-point organic solvents and respective content ratios shown in Tables 1 and 2. Furthermore, the SP values and viscosities of the respective high-boiling-point organic solvents were measured and noted down in Tables 1 and 2. Table 1 indicates a summary of experiments with the non-aggregating system and Table 2 indicates a summary of experiments with the aggregating system.

The assessment results are shown in Tables 1 and 2. The assessments made in the experiments were based on the following criteria.

Image Offset

A sensory evaluation was made of the extent of adherence of coloring material onto the roller after the fixing process in accordance with the following.

5: No adherence of coloring material at all.

4: Adherence of coloring material not visible with naked eye.

3: Slight adherence of coloring material, but within practical tolerances.

2: Severe adherence of coloring material, base surface of recording medium exposed; outside tolerances.

1: Virtually all of coloring material adheres to roller; outside tolerances.

Fixing Characteristics

Tape was attached to a solid image region one hour after the fixing process, the tape was peeled away at an angle of 90 degrees, and then a sensory evaluation was made of the extent of adherence of coloring material to the tape in accordance with the following.

5: No adherence of coloring material at all.

4: Adherence of coloring material not visible with naked eye.

3: Slight adherence of coloring material, but within practical tolerances.

2: Severe adherence of coloring material, base surface of recording medium exposed; outside tolerances.

1: Virtually all of coloring material adheres to tape; outside tolerances.

Ejection Stability

5: Ink ejection possible from all nozzles after leaving nozzles for ten minutes in environment at 25° C. and 50RH %;

4: Ink ejection possible from all nozzles after leaving nozzles for five minutes in environment at 25° C. and 50RH %;

3: Ink ejection possible from all nozzles after leaving nozzles for three minutes in environment at 25° C. and 50RH %;

2: Ink ejection possible from all nozzles after leaving nozzles for one minute in environment at 25° C. and 50RH %;

1: Some nozzles not performing ejection after leaving nozzles for one minute in environment at 25° C. and 50RH %;

Image Contraction During Fixing

The surface area ratio of the image size before and after fixing was measured for a 1 mm by 1 mm solid region.

5: Image contraction rate: 1% or lower

4: Image contraction rate: 3% or lower

3: Image contraction rate: 5% or lower

2: Image contraction rate: 10% or lower

1: Image contraction rate: greater than 10%

TABLE 1

(Non-aggregating system)

| | | Water-soluble organic solvent in ink | | | Assessment item | |
|---|---|---|---|---|---|---|
| Level | Solvent type | SP value | Content ratio (parts by weight) | Viscosity (ink at 25° C.) | Image offset | Ejection stability |
| 1 Comp. Ex. | Gly/DEG | 41/ 30.6 | 20/10 | 6.4 | 1 | 5 |
| 2 Comp. Ex. | | | 10/5 | 3.7 | 2 | 5 |
| 3 Comp. Ex. | TEA | 28.2 | 30 | 6.5 | 2 | 5 |
| 4 Present Invention | DPG | 27.1 | 30 | 8.8 | 4 | 5 |
| 5 Comp. Ex. | DEGmEE | 21.5 | 8 | 2.8 | 4 | 2 |
| 6 Present Invention | | | 10 | 3.2 | 4 | 4 |
| 7 Present Invention | | | 25 | 6.2 | 4 | 5 |

TABLE 1-continued (Non-aggregating system)

Water-soluble organic solvent in ink

| Level | | Solvent type | SP value | Content ratio (parts by weight) | Viscosity (ink at 25° C.) | Assessment item Image offset | Ejection stability |
|---|---|---|---|---|---|---|---|
| 8 | Present Invention | | | 30 | 7.2 | 4 | 5 |
| 9 | Comp. Ex. | | | 35 | 8.9 | 1 | 5 |
| 10 | Comp. Ex. | New Pole GP-250 | 24.6 | 8 | 3.1 | 4 | 2 |
| 11 | Present Invention | | | 10 | 3.3 | 4 | 4 |
| 12 | Present Invention | | | 25 | 8.2 | 4 | 5 |
| 13 | Comp. Ex. | | | 30 | 11.5 | 1 | 5 |
| 14 | Comp. Ex. | New Pole PP-200 | 23.8 | 30 | 10.4 | 1 | 5 |
| 15 | Present Invention | New Pole 50HB-55 | 21 | 30 | 8.8 | 4 | 5 |

TABLE 2

(Aggregating system)

Water-soluble organic solvent in ink

| Level | | Solvent type | SP value | Content ratio (parts by weight) | Viscosity (30% aqueous solution at 25° C.) | Assessment item Image offset | Ejection stability |
|---|---|---|---|---|---|---|---|
| 16 | Comp. Ex. | Gly | 41 | 30 | 1.9 | 2 | 5 |
| 17 | Comp. Ex. | | | 10 | | 2 | 4 |
| 18 | Comp. Ex. | DEG | 30.6 | 30 | 2.0 | 2 | 5 |
| 19 | Comp. Ex. | | | 10 | | 2 | 4 |
| 20 | Comp. Ex. | TEA | 28.2 | 30 | 2.5 | 2 | 5 |
| 21 | Comp. Ex. | | | 10 | | 2 | 4 |
| 22 | Comp. Ex. | DPG | 27.1 | 35 | 3.05 | 2 | 5 |
| 23 | Present Invention | | | 30 | | 4 | 5 |
| 24 | Present Invention | | | 10 | | 5 | 4 |
| 25 | Comp. Ex. | | | 8 | | 5 | 2 |
| 26 | Comp. Ex. | New Pole GP-250 | 24.6 | 35 | 4.15 | 2 | 5 |
| 27 | Present Invention | | | 30 | | 4 | 5 |
| 28 | Present Invention | | | 10 | | 5 | 4 |
| 29 | Comp. Ex. | | | 8 | | 5 | 2 |
| 30 | Comp. Ex. | DEGmEE | 21.5 | 35 | 2.9 | 2 | 5 |
| 31 | Present Invention | | | 30 | | 4 | 5 |
| 32 | Present Invention | | | 10 | | 5 | 4 |
| 33 | Comp. Ex. | | | 8 | | 5 | 2 |
| 34 | Comp. Ex. | New Pole 50 HB-55 | 21 | 35 | 3.8 | 2 | 5 |
| 35 | Present Invention | | | 30 | | 4 | 5 |
| 36 | Present Invention | | | 10 | | 5 | 5 |
| 37 | Comp. Ex. | | | 8 | | 5 | 2 |
| 38 | Comp. Ex. | New Pole 50 HB-110 | 20.6 | 35 | 4.64 | 2 | 5 |
| 39 | Present Invention | | | 30 | | 4 | 5 |
| 40 | Present Invention | | | 10 | | 5 | 4 |
| 41 | Comp. Ex. | | | 8 | | 5 | 2 |
| 42 | Comp. Ex. | New Pole GP-600 | 21.7 | 35 | 4.98 | 2 | 5 |
| 43 | Present Invention | | | 30 | | 4 | 5 |
| 44 | Present Invention | | | 10 | | 5 | 4 |
| 45 | Comp. Ex. | | | 8 | | 5 | 2 |
| 46 | Comp. Ex. | DEGmEE/ New Pole PE-61 | 21.5/ 20.1 | 20/10 | 5.15 | 2 | 5 |
| 47 | Comp. Ex. | | | 6.7/3.3 | | 2 | 5 |
| 48 | Comp. Ex. | New Pole PP-400 | 21.3 | 30 | 6.68 | 1 | 5 |
| 49 | Comp. Ex. | | | 10 | | 2 | 5 |
| 50 | Comp. Ex. | New Pole PE-61 | 20.1 | 30 | 11.3 | 1 | 5 |
| 51 | Comp. Ex. | | | 10 | | 2 | 4 |

As the evaluation results indicated in Table 1 reveal, in the experiments with the non-aggregating system, good results (of assessment value 4 or above) were obtained in respect of image offset and ejection stability in the case of Levels 4, 6 to 8, 11, 12 and 15 (indicated as "Present Invention" in the table) which used ink having a viscosity at 25° C. of 10 cP or lower and containing 10% or more and less than 30% of a water-soluble high-boiling-point organic solvent having an SP value of 28 or lower.

Furthermore, as the evaluation results indicated in Table 2 reveal, in the experiments with the aggregating system, good results (of assessment value 4 or above) were obtained in respect of image offset and ejection stability in the case of Levels 23, 24, 27, 28, 31, 32, 35, 36, 39, 40, 43 and 44 (indicated as "Present Invention" in the table) which used ink containing 10% or more and less than 30% of a water-soluble high-boiling-point organic solvent having an SP value of 28 or lower and having a viscosity at 25° C. of 5 cP or lower when in a 30% aqueous solution.

Changing the Viscosity of the Solvent

In the aggregating system described above, a further experiment was carried out by mixing together two types of ink solvent, GP-250 and DEGmEE, in the ratio indicated in Table 3, and adding at a rate of 15 parts by weight with respect to the total weight. Table 3 indicates the viscosity at 25° C. of the solvent in this case. In this experiment, the fixing properties were evaluated immediately after fixing, rather than one hour after the fixing process as described above.

TABLE 3

(Aggregating system)

| Level | | GP-250:DEGmEE | Solvent viscosity (at 100%) | Fixing properties (immediately after fixing) |
|---|---|---|---|---|
| 52 | Present Invention | 100:0 | 507 | 2 |
| 53 | Present Invention | 67:33 | 64.8 | 3 |
| 54 | Present Invention | 50:50 | 26.7 | 4 |
| 55 | Present Invention | 33:67 | 11.8 | 5 |
| 56 | Present Invention | 0:100 | 3.77 | 5 |

As the evaluation results indicated in Table 3 reveal, in an aggregating system, it is desirable in view of the fixing properties immediately after fixing that the viscosity of the water-soluble high-boiling-point organic solvent at 25° C. should be 65 cP or lower.

Change in Heating Drying Device and Drying Temperature

Moreover, experiments were carried out by changing the heating drying device and the drying temperature, in both a non-aggregating system and an aggregating system. Table 4 and Table 5 below indicate the conditions and the corresponding results. Level 58 indicates the same conditions as Level 2 in Table 1, and Level 64 indicates the same conditions as Level 28 in Table 2.

TABLE 4

(Non-aggregating system)

| Level | | Drying device | Drying temperature (° C.) | Image offset | Fixing properties |
|---|---|---|---|---|---|
| 57 | Present Invention | Warm air flow | 45 | 3 | 3 |
| 58 | Present Invention | Warm air flow | 50 | 4 | 4 |
| 59 | Present Invention | Warm air flow | 80 | 5 | 4 |
| 60 | Present Invention | Heating of medium rear surface | 45 | 3 | 3 |
| 61 | Present Invention | Heating of medium rear surface | 50 | 4 | 4 |
| 62 | Present Invention | Heating of medium rear surface | 80 | 5 | 5 |

TABLE 5

(Aggregating system)

| Level | | Drying device | Drying temperature (° C.) | Image offset | Fixing properties |
|---|---|---|---|---|---|
| 63 | Present Invention | Warm air flow | 45 | 4 | 3 |
| 64 | Present Invention | Warm air flow | 50 | 5 | 4 |
| 65 | Present Invention | Warm air flow | 80 | 5 | 4 |
| 66 | Present Invention | Heating of medium rear surface | 45 | 4 | 3 |
| 67 | Present Invention | Heating of medium rear surface | 50 | 5 | 4 |
| 68 | Present Invention | Heating of medium rear surface | 80 | 5 | 5 |

Addition or Non-Addition of Polymer Resin

Experiments were carried out with the non-aggregating system and the aggregating system, by changing the added amount of polymer resin in the ink to the added amounts indicated in Tables 6 and 7. Table 6 indicates the results relating to the non-aggregating system and Table 7 indicates the results relating to the aggregating system. Level 71 indicates the same conditions as Level 11 in Table 1, and Level 74 indicates the same conditions as Level 28 in Table 2.

TABLE 6

(Non-aggregating system)

| Level | | Amount of polymer added | Image offset | Fixing properties |
|---|---|---|---|---|
| 69 | Present Invention | None | 3 | 3 |
| 70 | Present Invention | Yes (4 parts by weight) | 3 | 4 |
| 71 | Present Invention | Yes (8 parts by weight) | 4 | 4 |

TABLE 7

(Aggregating system)

| Level | | Amount of polymer added | Image offset | Fixing properties |
|---|---|---|---|---|
| 72 | Present Invention | None | 3 | 3 |
| 73 | Present Invention | Yes (4 parts by weight) | 4 | 4 |
| 74 | Present Invention | Yes (8 parts by weight) | 5 | 4 |

As the evaluation results in Tables 6 and 7 reveal, it is desirable that the ink should contain a polymer resin.

Inclusion or Omission of Step of Drying Treatment Liquid

An experiment was carried out with the aggregating system with respect to the inclusion or omission of a step of drying the treatment liquid. The step of drying the treatment liquid according to the present experiment involved drying the treatment liquid in a heating unit to the downstream side of the place where the treatment liquid was applied (by heating the rear surface of the recording medium to 50° C. and blowing a heated air flow to 70° C. onto the front surface of the recording medium for two seconds), whereby a solid or semi-solid aggregating treatment agent layer was formed. The results of this assessment are indicated in Table 8. Level 76 indicates the same conditions as Level 17 in Table 2, and Level 78 indicates the same conditions as Level 28 in Table 2.

TABLE 8

(Aggregating system)

| Level | | Drying of aggregating agent carried out? | Image offset | Fixing properties | Image deformation during fixing |
|---|---|---|---|---|---|
| 75 | Comp. Ex. | No | 3 | 3 | 1 |
| 76 | Comp. Ex. | Yes | 2 | 4 | 3 |
| 77 | Present Invention | No | 4 | 3 | 4 |
| 78 | Present Invention | Yes | 5 | 4 | 5 |

As the evaluation results (for image deformation during fixing) indicated in Table 8 reveal, it is desirable to include a step of drying the treatment liquid.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image forming method comprising the steps of:
depositing an ink containing 10% or more and less than 30% of a water-soluble high-boiling-point organic solvent having an SP value of 28 $MPa^{1/2}$ or lower, onto a recording medium in accordance with an image signal, the ink having a viscosity of 10 cP or lower in a case where a temperature of the ink is 25° C.;
removing water contained in the solvent of the ink on the recording medium, by a heating drying device; and
heating and pressurizing the ink from which the water is removed onto the recording medium.

2. The image forming method as defined in claim 1, wherein a drying temperature of the heating drying device is 50° C. or higher.

3. The image forming method as defined in claim 1, wherein the ink contains a polymer resin.

4. The image forming method as defined in claim 1, wherein the recording medium is a coated paper.

5. An image forming apparatus, comprising:
an ink droplet ejection device which deposits an ink containing 10% or more and less than 30% of a water-soluble high-boiling-point organic solvent having an SP value of 28 $MPa^{1/2}$ or lower, onto a recording medium in accordance with an image signal, the ink having a viscosity of 10 cP or lower in a case where a temperature of the ink is 25° C.;
a heating drying device which removes water contained in the solvent of the ink on the recording medium; and
a heating and pressurizing fixing device which heats and pressurizes the ink from which the water is removed onto the recording medium.

* * * * *